US007844989B2

(12) United States Patent
Moon

(10) Patent No.: US 7,844,989 B2
(45) Date of Patent: Nov. 30, 2010

(54) METHOD AND BROADCASTING RECEIVER FOR DISPLAYING THE RECEIVING STATUS OF BROADCASTING PROGRAM INFORMATION

(75) Inventor: Byung-Hoon Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 546 days.

(21) Appl. No.: 11/588,356

(22) Filed: Oct. 27, 2006

(65) Prior Publication Data
US 2007/0118854 A1 May 24, 2007

(30) Foreign Application Priority Data
Nov. 24, 2005 (KR) ...................... 10-2005-0113156

(51) Int. Cl.
G06F 3/00 (2006.01)
G06F 3/048 (2006.01)
H04N 7/10 (2006.01)
H04N 7/16 (2006.01)

(52) U.S. Cl. .............................. 725/50; 725/9; 725/39; 715/772

(58) Field of Classification Search .................. 725/50, 725/9, 39; 715/772
See application file for complete search history.

(56) References Cited

U.S. PATENT DOCUMENTS 6,782,550 B1 * 8/2004 Cao ............................ 725/39
2005/0235313 A1 10/2005 Yamada et al.
2006/0179469 A1 * 8/2006 Fransman et al. ........... 725/115

FOREIGN PATENT DOCUMENTS

JP 2004088282 3/2004
JP 2005-102009 A 4/2005
KR 10-2001-0039213 A 5/2001
KR 10-2003-0008201 A 1/2003
KR 10-2004-0074342 A 8/2004

OTHER PUBLICATIONS

N.N.: "Nextview EPG Decoder Documentation" [Online] Dec. 11, 2004, XP002422454, Retrieved from the Internet: URL:<http://web.archive.org/web/20041211111242/nxtvepg.sourceforge.net/man.html> [retrieved on Feb. 27, 2007], p. 1, pp. 6-18.
"NextView EPG 2.5.0 Screen Shot", SUSE LINUX 9.0, [Online] 2003, XP002422455, [retrieved on Feb. 28, 2007], the whole document.
N.N.: NextView EPG Screen Shot: [Online], Jan. 11, 2003, XP002422456, Retrieved from the internet: <URL:http://web.archive.org/web/20031011094928/nxtvepg.sourceforge.net/screenshot-series.gif> [retrieved on Feb. 27, 2007], the whole document.
"NextView EPG Release Note 2.7.3" [Online], Dec. 11, 2004, XP002422457, Retrieved from the Internet: URL:http://web.archive.org/web/20041211093949/nxtvepg.sourceforge.net/index.html> [retrieved on Feb. 27, 2007], the whole document.

* cited by examiner

Primary Examiner—Hoang-Vu A Nguyen-Ba
(74) Attorney, Agent, or Firm—Sughrue Mion, PLLC

(57) ABSTRACT

A broadcasting program information displaying method and broadcasting receiver are provided. The broadcasting program information displaying method includes checking whether broadcasting program information to be displayed on a screen is completely received when a user selects a broadcasting program information displaying function; and forming receiving state information according to a checking result and displaying the receiving state information on the screen along with each broadcasting program information corresponding to the receiving state information. Accordingly, a state of receiving broadcasting program information on a screen can be easily determined.

26 Claims, 6 Drawing Sheets

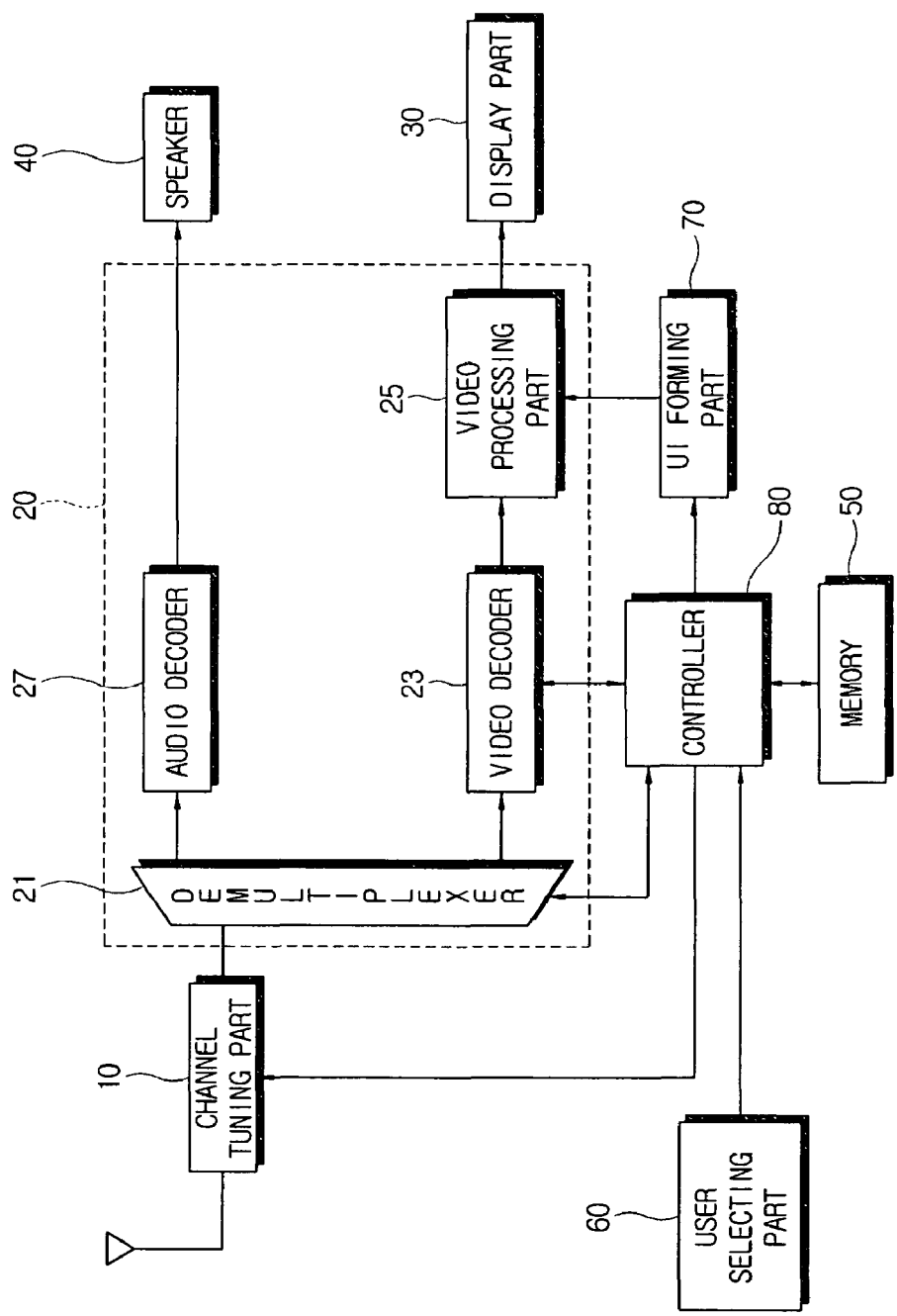

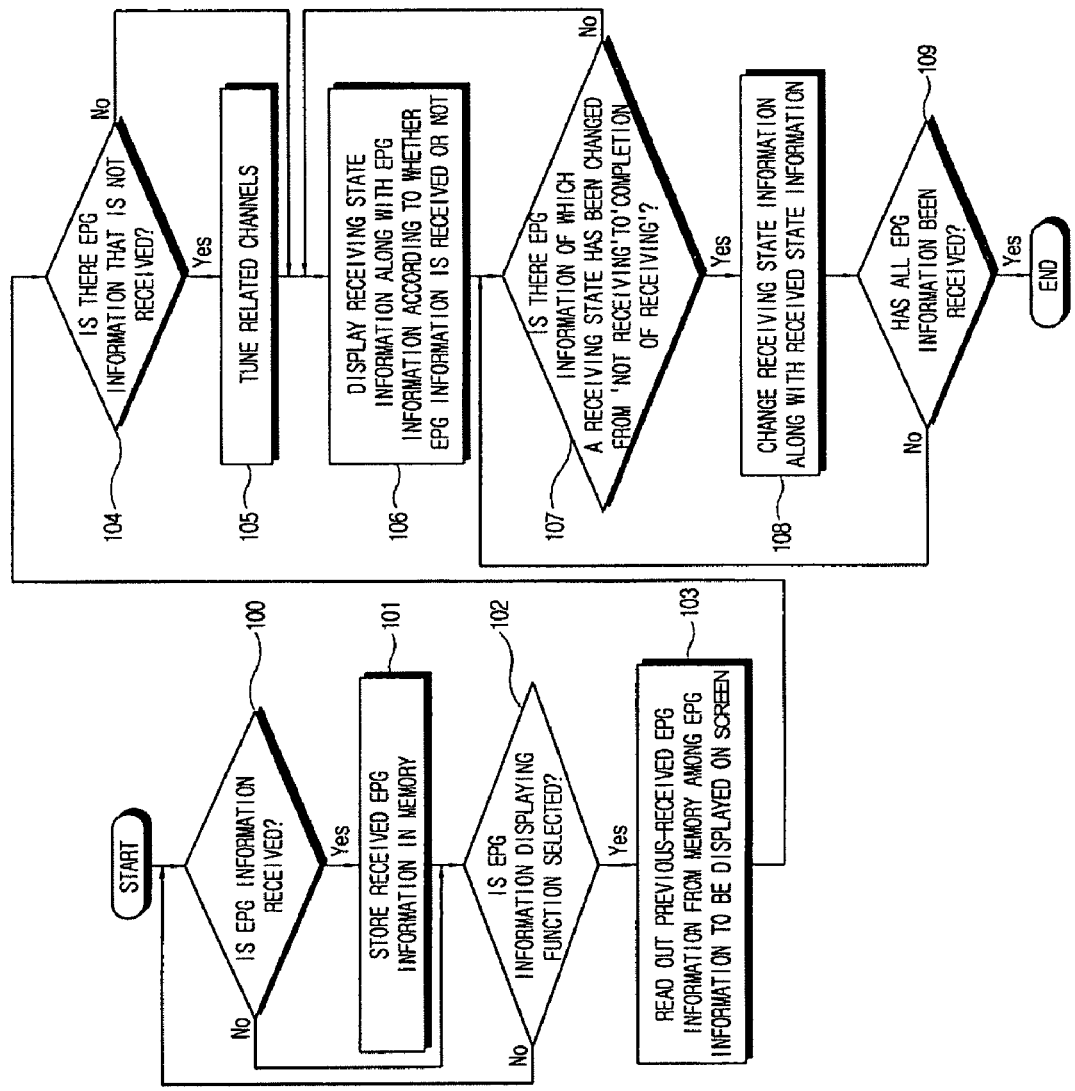

METHOD AND BROADCASTING RECEIVER FOR DISPLAYING THE RECEIVING STATUS OF BROADCASTING PROGRAM INFORMATION

CROSS-REFERENCE TO RELATED APPLICATIONS

This application claims priority from Korean Patent Application No. 10-2005-0113156, filed on Nov. 24, 2005 in the Korean Intellectual Property Office, the entire disclosure of which is incorporated herein by reference.

BACKGROUND OF THE INVENTION

1. Field of the Invention

Apparatuses and methods consistent with the present invention relate to displaying broadcasting program information, and more particularly, to broadcasting program information displaying methods and broadcasting receivers that display information indicating whether broadcasting information is received.

2. Description of the Related Art

Generally, a broadcasting station provides arrangement information of a broadcasting program as service information through a related channel or an additional channel in addition to the image and audio signals of the broadcasting program. Arrangement information of a broadcasting program that is currently being broadcast is provided by an electronic program guide (EPG). A broadcasting receiver such as a set-top box, a television (TV) and so on receives related information which may be displayed on an EPG information window. Through the EPC, a user can select a desired channel and make a reservation for receiving and/or recording programs to be broadcast at a future time.

In detail, if a user selects a displaying function of the EPG information, the broadcasting receiver immediately displays content of previously-stored program information on a screen among broadcasting program information to be displayed. Also, in a case in which broadcasting program information is not received, the broadcasting receiver tunes to a related channel to receive the relevant broadcasting program information. At this time, if reception of the broadcasting program information is incomplete after tuning to the related channel, the broadcasting receiver generally displays "no data" instead of content of the broadcasting program until reception of the broadcasting program information is complete.

However, if the time required to receive the broadcasting program information is lengthy or if the EPG information is not provided by a related channel, it can be inconvenient for a user to be unable to determine a receiving state of the related channel because "no data" is displayed on a related area of an EPG information window for a long period of time.

SUMMARY OF THE INVENTION

The present invention provides a broadcasting program information displaying method and a broadcasting receiver for user's convenience by displaying a receiving state of broadcasting program information on a screen, which is completely received or that is in the middle of receiving.

According to an aspect of the present invention, there is provided a broadcasting program information displaying method comprising: determining whether broadcasting program information of at least one broadcasting program is completely received; generating receiving state information according to a result of the determining; and displaying on a screen the receiving state information and the broadcasting program information of the at least one broadcasting program to indicate whether the broadcasting program information for the at least one broadcasting program is completely received.

According to another aspect of the present invention, the determining whether the broadcasting program information of the at least one broadcasting program is completely received may comprise reading out previously received broadcasting program information among the broadcasting program information to be displayed on the screen from a memory; and tuning to a channel which includes the broadcasting program information if the broadcasting program information is not received.

According to another aspect of the present invention, the displaying on the screen may comprise displaying the broadcasting program information that is previously received and the broadcasting program information that is not received on an area of the screen along with each receiving state information corresponding to the broadcasting program information that is previously received and the broadcasting program information that is not received.

According to another aspect of the present invention, the displaying on the screen may comprise parsing the broadcasting program information which is received from the tuned channel to display the parsed information on the screen and changing the receiving state information.

According to another aspect of the present invention, the receiving state information may include information indicating at least one receiving state among completely received, incomplete reception and no broadcast program information available for each channel.

According to another aspect of the present invention, the broadcasting program information displayed on the screen may comprise at least one among a channel name, a broadcasting station name, and a broadcasting program title.

According to another aspect of the present invention, the receiving state information may be displayed as a shape having a color on a region of the screen corresponding to each broadcasting program information that is displayed.

According to another aspect of the present invention, the color may be changed according to the receiving state of the broadcasting program information.

According to another aspect of the present invention, the receiving state information may be displayed as at least one of an icon and text data.

According to another aspect of the present invention, the at least one of the icon and text data may be displayed so as to identify the at least one receiving state of the broadcasting program information.

According to another aspect of the present invention, the broadcasting program information may comprise electronic program guide information.

According to another aspect of the present invention, the determining whether the broadcasting program information of the at least one broadcasting program may be performed if a broadcasting program information displaying function is performed.

According to another aspect of the present invention, the receiving state information for each of a plurality of broadcasting programs may be displayed on the screen concurrently along with the broadcasting program information of each of the plurality of broadcasting programs.

According to another aspect of the present invention, a broadcasting receiver is provided comprising: a channel tuning part which tunes a broadcasting channel; a memory which stores broadcasting program information received by the channel tuning part; and a controller which determines whether the broadcasting program information of at least one broadcasting program is completely received to generate receiving state information, and displays on a screen the receiving state information and the broadcasting program information of the at least one broadcasting program to indicate whether the broadcasting program information for the at least one broadcasting program is completely received.

According to another aspect of the present invention, the controller may read out previously received broadcasting program information from the memory among the broadcasting program information to be displayed on the screen, and controls the channel tuning part to tune at least one channel which includes the broadcasting program information if the broadcasting program information is not received.

According to another aspect of the present invention, the broadcasting receiver may further comprise a user interface generating part which generates a broadcasting program information displaying window, wherein the controller displays the broadcasting program information that is previously received and the broadcasting program information that is not received on an area of a displaying window along with each receiving state information corresponding to the broadcasting program information that is previously received and the broadcasting program information that is not received.

According to another aspect of the present invention, the controller may parse the broadcasting program information which is received from the tuned channel to display the parsed information on the displaying window and control the user interface generating part to allow changing the receiving state information.

According to another aspect of the present invention, the receiving state information may include information indicating at least on receiving state among completely received, incomplete reception, and no broadcast program information available for each channel.

According to another aspect of the present invention, the broadcasting program information to be displayed on the screen may comprise at least one among a channel name, a broadcasting station name and a broadcasting program title.

According to another aspect of the present invention, the controller may display the receiving state information by a shape having a color on a region of the screen corresponding to each broadcasting program information that is displayed.

According to another aspect of the present invention, the controller may change the color according to the receiving state of the broadcasting program information.

According to another aspect of the present invention, the receiving state information may be displayed as at least one of an icon and text data.

According to another aspect of the present invention, the at least one of the icon and text data may be displayed so as to identify the at least one receiving state of the broadcasting program information.

According to another aspect of the present invention, the broadcasting program information may comprise electronic program guide information.

According to another aspect of the present invention, the controller may determine whether the broadcasting program information of the at least one broadcasting program when a broadcasting program information displaying function is performed.

According to another aspect of the present invention, the receiving state information for each of a plurality of broadcasting programs may be displayed on the screen concurrently along if the broadcasting program information of each of the plurality of broadcasting programs.

BRIEF DESCRIPTION OF THE DRAWINGS

The above and other aspects of the present invention will become apparent and more readily appreciated from the following description of the exemplary embodiments, taken in conjunction with the accompanying drawings of which:

FIG. 1 is a control block diagram of a digital TV according to an exemplary embodiment of the present invention;

FIG. 3 is a flowchart showing a displaying method of broadcasting program information according to an exemplary embodiment of the present invention.

DETAILED DESCRIPTION OF THE EXEMPLARY EMBODIMENTS OF THE INVENTION

Figure 2A:
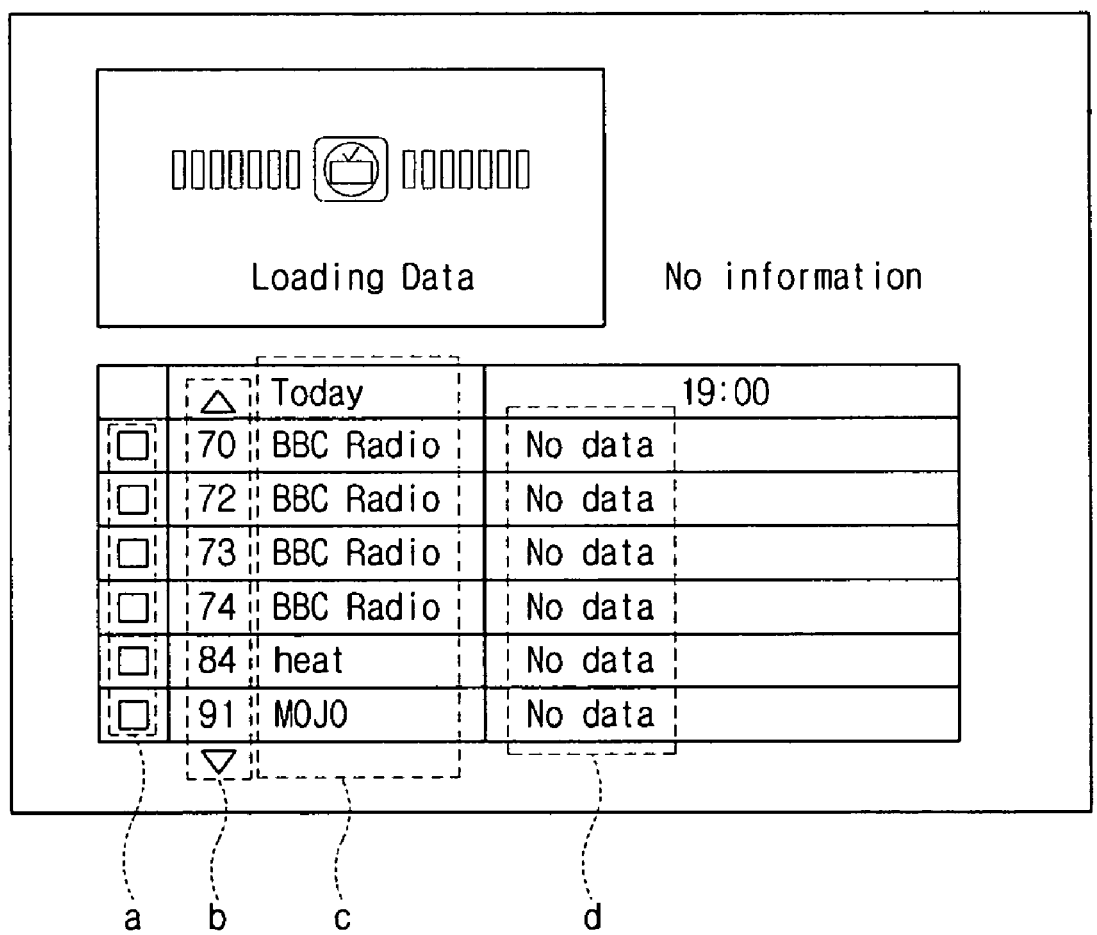
FIGS. 2A to 2D illustrate an EPG displaying screen according to an exemplary embodiment of the present invention.

Reference will now be made in detail to exemplary embodiments of the present invention, examples of which are illustrated in the accompanying drawings, wherein like reference numerals refer to like elements throughout.

A digital TV is taken as an example of broadcasting receivers according to an exemplary embodiment of the present invention in the following description.

FIG. 1 is a control block diagram of a digital TV according to an exemplary embodiment of the present invention. As shown in FIG. 1, the digital TV comprises a channel tuning part 10, a signal processing part 20, a displaying part 30, a speaker 40, a memory 50, a user selecting part 60, a UI forming part 70 and a controller 80.

The channel tuning part 10 includes a tuner and a demodulator in order to tune a broadcasting signal having a frequency range corresponding to a controlling signal of the controller 80 described below. The tuner tunes the broadcasting signal received through an antenna or other input. The demodulator outputs the broadcasting signal as a transport stream after tuning the broadcasting signals through a demodulating process, such as vestigial sideband (VSB) demodulation, performing error correction, and other processing.

The signal processing part 20 according to an exemplary embodiment of the present invention comprises a demultiplexer 21 and a video decoder 23, video processing part 25 and an audio decoder 27.

The broadcasting signal is demodulated by the channel tuning part 10 and separated into a video signal, an audio signal and additional data, referred to as program and service information protocol (PSIP) data, by the demultiplexer 21 and output as a transport stream.

The video signal, after being separated by the demultiplexer 21, is decoded by the video decoder 23 and processed by the video processing part 25 so as to be suitable for vertical frequency, resolution, aspect ratio and so on in accordance with an output standard of the displaying part 30. The video processing part 25 may also include a scaler.

Also, the displaying part 30 can be applied to a variety of types of display modules such as digital light processing (DLP), liquid crystal display (LCD), plasma display panel (PDP) and so on.

The audio signal separated by the demultiplexer 21 is decoded by the audio decoder 27 to be output through the speaker 40.

In the meanwhile, additional data based on the PSIP separated by the demultiplexer 21 comprises EPG information, as guide information on broadcasting programs. The received EPG information is stored in the memory 50 by the controller 80 described below.

The EPG information may comprise system time table (STT), master guide table (MGT), virtual channel table (VCT), rating region table (RRT), event information table (EIT), and extended text table (ETT) data, which are based on the PSIP.

The user selecting part 60, which is designed for channel selection and/or EPG displaying function selection, may comprise menu keys on a remote controller and a key signal generating part for generating a key signal corresponding to key manipulation. The user selecting part 60 may be provided as a mouse, a keyboard, etc. or may be provided on a TV main panel.

Also, the digital TV according to an exemplary embodiment of the present invention may further comprise UI forming part 70 for forming an EPG displaying window to display the received EPG information on a screen, which may be displayed by an on-screen display (OSD) generating circuit and the like. The EPG displaying window formed by the UI forming part 70, which comprises an item for showing a receiving state of EPG information as described below in detail, is processed by the video processing part 25 to be displayed on the screen.

The controller 80, which is designed by microcomputer, central processing unit (CPU), etc., controls each component of the digital TV to allow related functions to be performed in case of selecting channels and/or EPG displaying functions by the user selection part 60.

In detail, if the EPG displaying function is selected through the user selection part 60, the controller 80 reads out previously-received information among EPG information to be displayed on the screen from the memory 50 and controls the UI forming part 70 to form a related content and display the content on the EPG displaying window. Also, the controller 80 controls the channel tuning part 10 to tune to the related channel to receive information that has not been received among the EPG information, and receive the relevant EPG information. Further, the controller 80 parses the EPG information received from the tuned channel and controls the UI forming part 70 to display the parsed EPG information on the EPG displaying window.

The EPG displaying window, which is formed by the UI forming part 70 in accordance with control of the controller 80 according to an exemplary embodiment of the present invention, is explained with reference to FIGS. 2A to 2D, which illustrate changes of a displaying window by time sequence.

As shown in FIGS. 2A to 2D, the EPG displaying window formed by the UI forming part 70 comprises item "a" for showing receiving state information, item "b" for displaying a channel name, item "c" for displaying a broadcasting station name and item "d" for displaying a program title. Also, program broadcast content corresponding to the current cursor position may be displayed or thumbnail information related to the program may be displayed in a rectangular window located in the upper-left portion of the EPG A program title corresponding to current cursor position and the broadcasting time information related to the program may be displayed, for example, as "Life's Best Soundtrack, 18:00~0:00", at the upper-right in window of FIG. 2B. At this time, the information corresponding to a related channel (service) is changed according to a cursor's movement.

The item "a" displays the information on a receiving state indicating whether EPG information on related channels has been completely received, is currently in the process of being received, and/or can not be received. As shown in FIGS. 2A to 2D, this receiving state information may be displayed by using rectangle-shaped flags, and the receiving state of related information may be indicated with color changes of flags.

In a case in which the EPG information is not received, "No data" may be displayed instead of the related program title.

For example, when the EPG displaying function is selected through the user selecting part 60, the controller 80 will read out previously-received information from the memory 50 among EPG information displayed on the screen to provide the read information to the UI forming part 70, and EPG displaying windows may be formed as shown in the window of FIG. 2A. At this time, there is no EPG information that was previously received and displayed on the screen. Thus, each of six flags in the item "a" is filled with a same color to indicate the receiving state as being incomplete, and "no data" is displayed for each of the six corresponding channels (services) in the item "d".

The controller 80 controls the channel tuning part 10 to tune the channel that is not received and to receive EPG information. The controller 80 parses EPG information of the received related channel to provide the related EPG information to the UI forming part and to display the related EPG information on the EPG displaying window as shown in the window of FIG 2B.

Figure 2B:
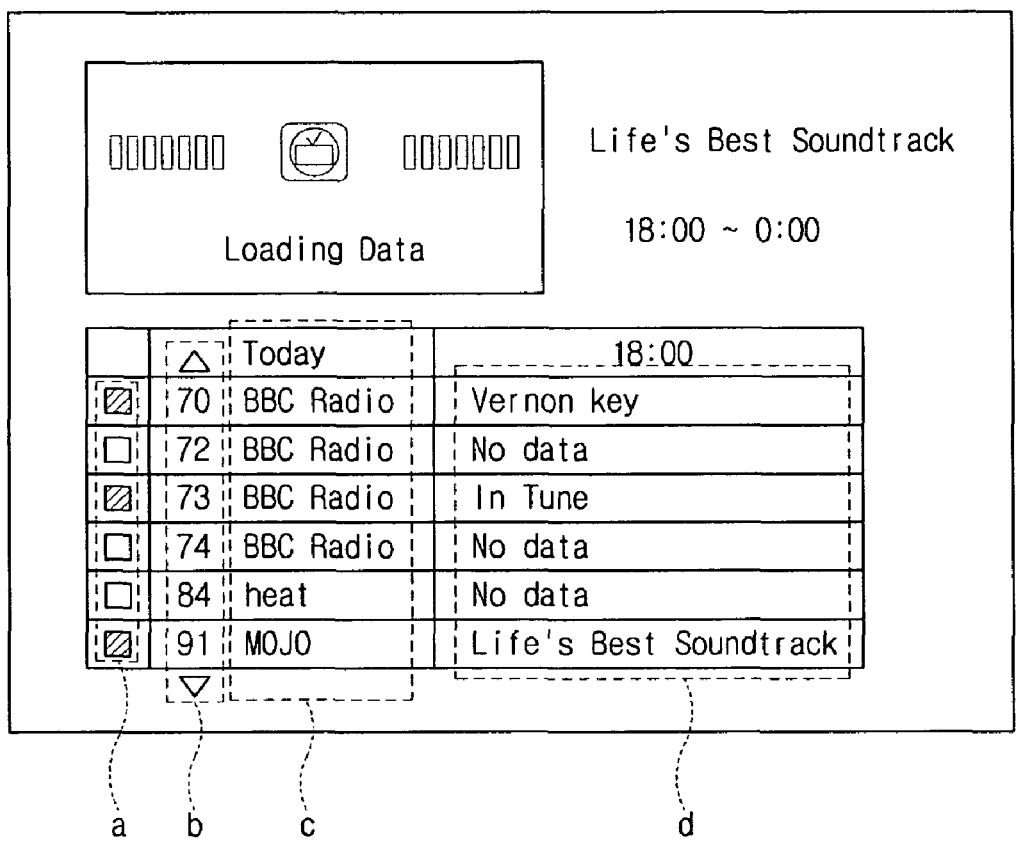

That is, as shown in FIGS. 2A to 2D, related EPG information is received for channels "70", "73" and "91" among the six channels (services). As indicated in the window of FIG. 2(B), the color of each the three flags in item "a" corresponding to these channels is changed after the related EPG information is received, and each of the related program titles in item "d" are displayed instead of "No data." Accordingly, a user can clearly distinguish between an incomplete and complete state of receiving EPG information of each channel (service).

Figure 2C:
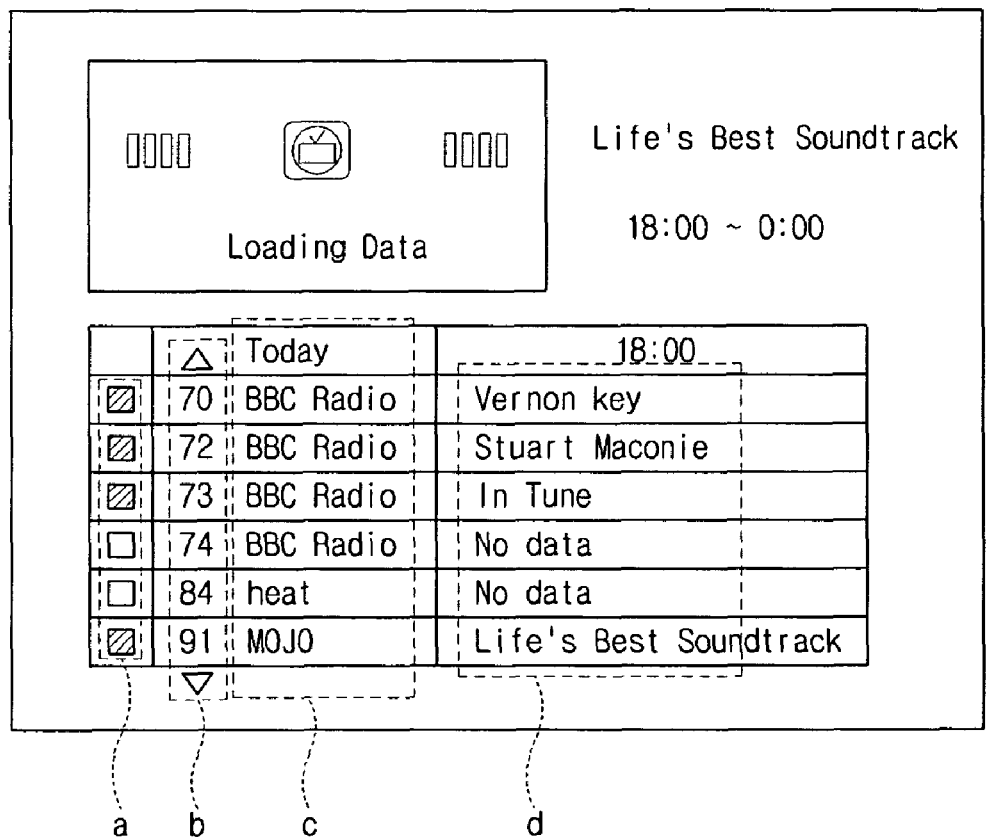
Figure 2D:
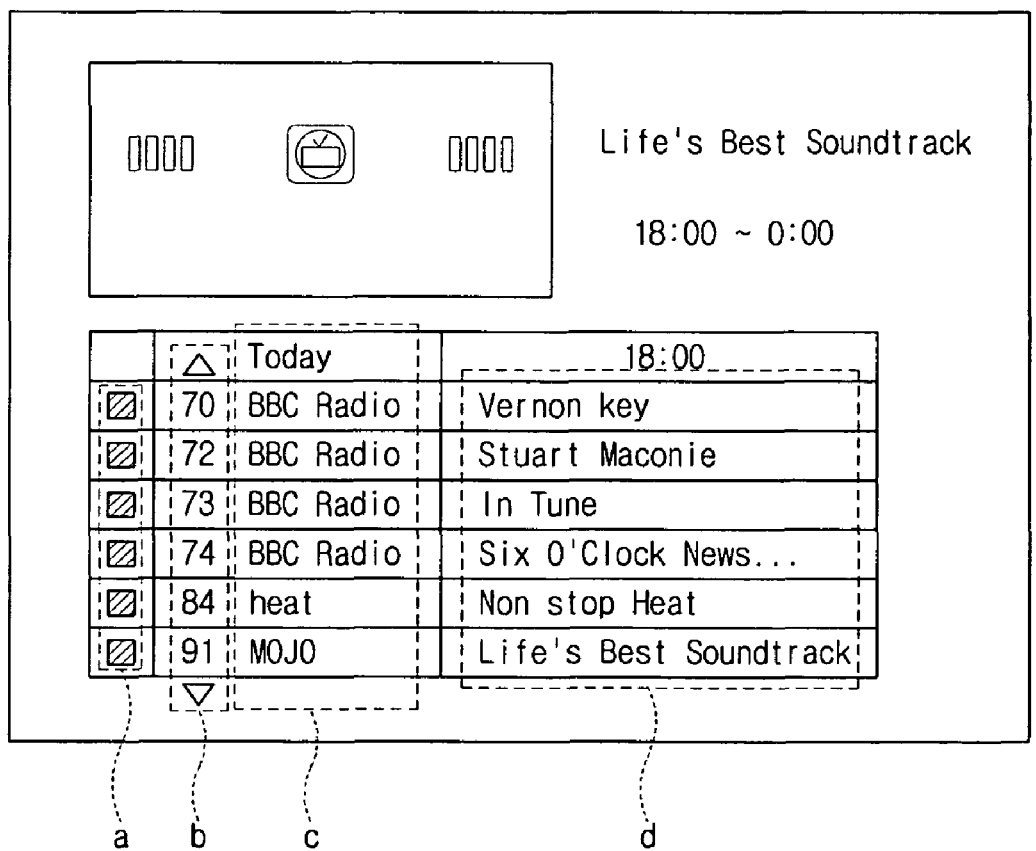

Subsequently, as shown in the window of FIG. 2C, EPG information corresponding to the channel "72" is received, the flag color in the item "a" is changed to indicate that reception of the corresponding EPG information is complete, and the related program title is displayed in the item "d". Also, if all channels are completely tuned at a further point in time, as shown in the window of FIG. 2D, the EPG information corresponding to channel "74" and "84" is completely received, and these two flag colors in the item "a" are changed. The related program titles in the item "d" are displayed.

At this time, a user can view EPG information of other channels (services) by manipulating an upper and a lower key on the top and bottom of the item "b". At this time, the controller 80 controls reading out the EPG information corresponding to the related channel (services) from the memory 50 or to tune the related channel to receive the related EPG information.

Accordingly, a user can recognize a receiving state of EPG information of a related channel by displaying an item that indicates receiving state information as to whether reception of EPG information to be displayed on a screen is complete or incomplete.

In FIGS. 2A to 2D, it is explained that a receiving state of EPG information comprises two states, i.e., completely received or incomplete reception. However, the receiving state can further comprise a state of "no availability of receiving" in the case of a channel, such as an analog channel, for which EPG information is not additionally provided. For example, a green color may be used to indicate that EPG information is completely received, a red color may be used to indicate that the EPG information is not completely received, and a black color may be used to indicate that EPG information is not available. Also, in FIGS. 2A to 2D, rectangle-shaped flags are used. However, flags having a variety of shapes such as a circle, a diamond, etc. may also be used. Likewise, text data or an icon may be used instead of flags having a variety of shapes.

An EPG information displaying method according to an exemplary embodiment of the present invention is explained below with reference to FIG. 3.

If a channel is selected by a user, the controller 80 controls channel tuning part 10 to tune the related channel. The signal processing part 20 processes a signal received according to the tuned channel and displays the processed signal on the displaying part 30. At this time, if EPG information is received along with a video signal and an audio signal at operation 100, the controller 80 stores the received EPG information in the memory 50 at operation 101.

These operations are repeated whenever channels are changed. However, previously-stored EPG information may be not stored redundantly. In case of a different version of EPG information, the different version may be stored. When it comes to a digital broadcasting, a plurality of sub channels (services) are provided through a physical channel. Thus, if a channel is tuned, EPG information of various sub channels belonging to the channel can be received.

In the meanwhile, if an EPG information displaying function is selected through the user selecting part 60 at operation 102, the controller 80 reads out the previously-received EPG information from a memory 50 among EPG information to be displayed on a screen at operation 103. Also, if there is EPG information that is not received, the controller 80 controls channel tuning part 10 to tune related channels at operation 105. If there is no previously-received EPG information, all channels (services) to be displayed on the screen are tuned. At this time, in regard to the same physical channels of channels to be tuned, the desired EPG information can be received by tuning only one related physical channel. However, in regard to the different physical channels of channels to be tuned, the related EPG information is received by tuning the related channels. This operation to tune the related channel is not performed unless there is EPG information that is not received.

The controller 80 provides previously-received EPG information to the UI forming part 70 to form an EPG displaying window at operation 106. At this time, as described above, the EPG displaying window comprises an item for showing receiving state information of the EPG information for each channel (service). For example, a green color may be used to indicate that EPG information is completely received for a channel, a red color may be used to indicate that EPG information is not completely received, and a black color may be used to indicate that EPG information is not available to be received. Accordingly, a user can recognize a receiving state of EPG information for each channel (service).

In the meanwhile, in a case in which the receiving state of a channel having EPG information changes from not received to completely received at operation 107, the flag color that indicates the state of receiving the EPG information of the related channel is changed from red to green along with the received EPG information at operation 108. These operations continue to be repeated until all EPG information of channels (services) displayed on the screen are completely received at operation 109. In the middle of these operations, if the displaying window of EPG information turns over to a new page according to a user's selection (e.g., by scrolling through program listings), the operations 103 through 109 are repeated to display the EPG information corresponding to the channels (services) displayed on the related page.

Exemplary embodiments of the present invention have been described with reference to a digital TV, other exemplary embodiments may be applied to other types of broadcasting receivers comprising a set-top box, or other receiver having a function to receive broadcasting program service information comprising EPG information and so on.

As described above, broadcasting program information displaying methods and broadcasting receivers are provided which are capable of providing' convenience to users by displaying a receiving state of broadcasting program information.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A method of displaying broadcasting program information, the method comprising:
    determining whether first broadcasting program information of a first broadcasting program is completely received;
    generating first receiving state information if it is determined that the first broadcasting program information is completely received, and generating second receiving state information if it is determined that the first broadcasting program information is not completely received;
    simultaneously displaying on a screen the first broadcasting program information and the first receiving state information if it is determined that the first broadcasting program information is completely received, and
    displaying on the screen the second receiving state information if it is determined that the first broadcasting program information is not completely received.

2. The method according to claim 1, wherein the determining whether the first broadcasting program information is completely received comprises reading out previously received first broadcasting program information among a plurality of broadcasting program information to be displayed on the screen from a memory; and tuning to a channel which includes the first broadcasting program information if the first broadcasting program information is not received.

3. The method according to claim 2, wherein the simultaneously displaying on the screen comprises displaying the first broadcasting program information that is previously received along with the first receiving state information corresponding to the first broadcasting program information that is previously received.

4. The method according to claim 2, wherein the displaying on the screen comprises parsing the first broadcasting program information which is received from the tuned channel to display the parsed first broadcasting information on the screen and changing the first receiving state information.

5. The method according to claim 1, wherein the first receiving state information includes information indicating at least one receiving state among completely received, incomplete reception and no broadcast program information available for each channel.

6. The method according to claim 5, wherein the first receiving state information is displayed as a shape having a color on a region of the screen corresponding to the first broadcasting program information that is displayed.

7. The method according to claim 6, wherein the color is changed according to the first receiving state information of the first broadcasting program information.

8. The method according to claim 5, wherein the first receiving state information is displayed as at least one of an icon and text data.

9. The method according to claim 8, wherein the at least one of the icon and text data are displayed so as to identify the first receiving state information of the first broadcasting program information.

10. The method according to claim 1, wherein the first broadcasting program information displayed on the screen comprises at least one among a channel name, a broadcasting station name, and a broadcasting program title.

11. The method according to claim 1, wherein the first broadcasting program information comprises electronic program guide information.

12. The method according to claim 1, wherein the determining whether the first and the second broadcasting program information are completely received is performed if a broadcasting program information displaying function is performed.

13. The method according to claim 1, wherein the first receiving state information for the first broadcasting program is displayed on the screen concurrently along with the first broadcasting program information of each of a plurality of broadcasting programs.

14. A broadcasting receiver comprising:
a channel tuning part which tunes a broadcasting channel;
a memory which stores first broadcasting program information received by the channel tuning part; and
a controller which determines whether the first broadcasting program information is completely received, generates first receiving state information and simultaneously displays on a screen the first broadcasting program information and the first receiving state information if the first broadcasting program information is completely received, and generates second receiving state information and displays the second receiving state information if the first broadcasting program information is not completely received.

15. The broadcasting receiver according to claim 14, wherein the controller reads out a previously received first broadcasting program information from the memory among a plurality of broadcasting program information to be displayed on the screen, and controls the channel tuning part to tune at least one channel which includes the first broadcasting program information if the first broadcasting program information is not received.

16. The broadcasting receiver according to claim 15, which further comprises a user interface generating part which generates a broadcasting program information displaying window,
wherein the controller displays the first broadcasting program information that is previously along with the first receiving state information corresponding to the first broadcasting program information that is previously received.

17. The broadcasting receiver according to claim 16, wherein the controller parses the first broadcasting program information which is received from the tuned channel to display the parsed information on the displaying window and controls the user interface generating part to allow changing the first receiving state information.

18. The broadcasting receiver according to claim 16, wherein the controller displays the first receiving state information by a shape having a color on a region of the screen corresponding to the first broadcasting program information that is displayed.

19. The broadcasting receiver according to claim 18, wherein the controller changes the color according to the first receiving state information of the first broadcasting program information.

20. The broadcasting receiver according to claim 16, wherein the first receiving state information is displayed as at least one of an icon and text data.

21. The broadcasting receiver according to claim 20, wherein the at least one of the icon and text data are displayed so as to identify the at least one receiving state information of the first broadcasting program information.

22. The broadcasting receiver according to claim 14, wherein the first receiving state information includes information indicating at least one receiving state among completely received, incomplete reception and no broadcast program information available for each channel.

23. The broadcasting receiver according to claim 14, wherein the first broadcasting program information to be displayed on the screen comprises at least one among a channel name, a broadcasting station name and a broadcasting program title.

24. The broadcasting receiver according to claim 14, wherein the first broadcasting program information comprises electronic program guide information.

25. The broadcasting receiver according to claim 14, wherein the controller determines whether the first broadcasting program information is completely received if a broadcasting program information displaying function is performed.

26. The broadcasting receiver according to claim 14, wherein the first receiving state information is displayed on the screen concurrently along with the first broadcasting program information of each of a plurality of broadcasting programs.

* * * * *